July 17, 1951     D. B. DOOLITTLE     2,560,637
PARACHUTE INITIAL PEAK LOAD REDUCER
Filed Oct. 17, 1949
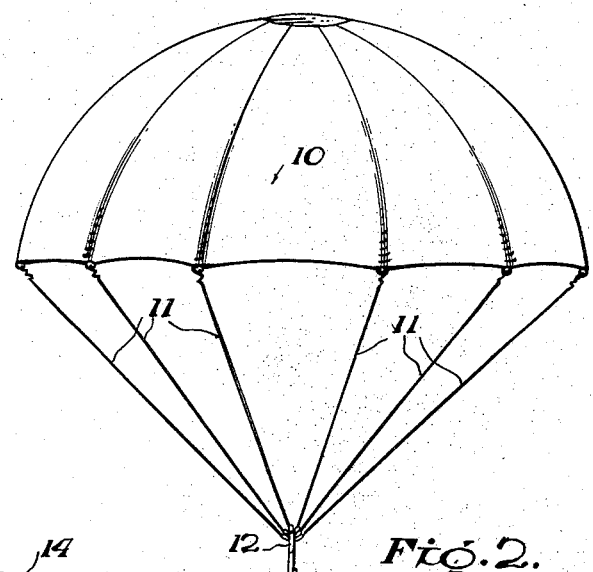
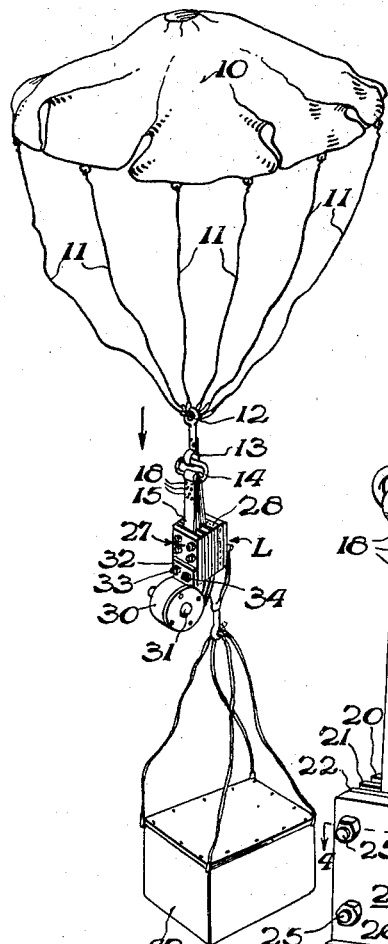
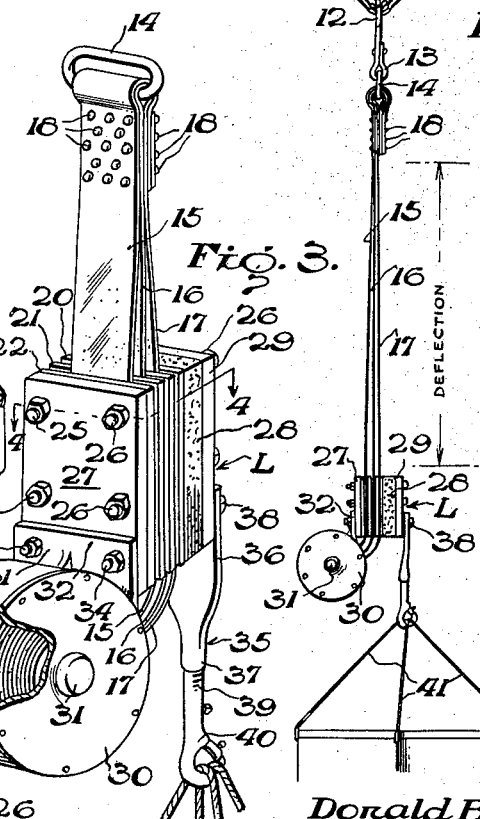
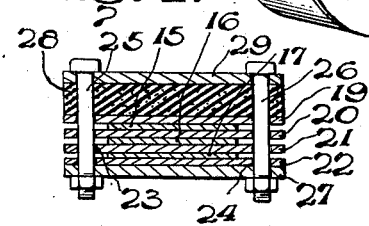
INVENTOR
Donald B. Doolittle.
BY Herbert M. Birch
ATTORNEY Patented July 17, 1951

2,560,637

UNITED STATES PATENT OFFICE 2,560,637

PARACHUTE INITIAL PEAK LOAD REDUCER

Donald B. Doolittle, Wilmington, Del., assignor to All American Airways, Inc., Wilmington, Del., a corporation of Delaware Application October 17, 1949, Serial No. 121,858

3 Claims. (Cl. 244—151)

The present invention relates to parachutes and more particularly to a novel structure formed to substitute for the usual parachute leader which connect to the usual canopy shroud lines.

The parachute has always been an essential part of aircraft equipment and many meritorious improvements have been developed to increase the safety of parachutes and to give the user a feeling of greater confidence and security when a jump becomes necessary to save his life. One of the greatest faults of the parachute is the inability of the same to safely absorb the initial shock developed when the parachute is first opened under conditions of practical usage and it is an object of the present invention to provide a novel shock absorber to reduce the shock load transmitted to the parachute during initial opening of the parachute, particularly at high velocities. By using a means to reduce this load, the parachute may be made lighter in weight and may operate at higher velocities.

Also, fragile articles are sometimes dropped by parachute and it is important to provide efficient shock absorption under these conditions to prevent damage to such articles.

Heretofore, there have been many attempts to develop shock absorbers for parachutes, but substantially all such prior attempts have been generally unsatisfactory as such prior shock absorbers are usually of an elastic nature and rebound after the initial shock with a force great enough to cause injury to the chutist or to articles being dropped. Accordingly, it is another object of the invention to provide a shock absorber for interposition between the shroud lines and lead lines of a parachute assembly, which shock absorber will be deflected by the initial shock developed by the opening of the parachute and while so deflecting absorb energy during its entire deflection and which will not be followed by any rebound action.

With the above advantages and objects in view, the present invention consists of the novel construction, arrangement and combination of parts, wherein one embodiment of the same is hereinafter described and illustrated in conjunction with the accompanying drawings.

In the drawings wherein like parts are given the same numerals and are referred to by the same numerals in the specification:

Fig. 1 is a general perspective view of one embodiment of the invention shown connected to the shroud lines of a parachute before opening and application of load forces are linearly developed to deflect the device.

Fig. 2 is a side elevational view of the invention deflected after having responded to the initial shock of the parachute during the opening thereof.

Fig. 3 is an enlarged perspective view of the shock absorber unit per se.

Fig. 4 is a transverse cross sectional view taken along the line 4—4 of Fig. 3.

Referring in detail to the drawings and first with particular reference to Figs. 1 and 2 there is shown a fabric parachute canopy 10 with the usual plurality of shroud lines 11. The shroud lines converge into a connecting ring 12 to which they are coupled in any suitable manner. The shroud line connecting or coupling ring 12 may be integrally formed with a snap hook fastener 13.

A novel leader assembly L, which connects to the snap hook fastener 13 from the shroud lines 11 is generically indicated in Fig. 1 and includes an elongated ring or link 14. Looped around the lower span of the link 14 are the ends of a plurality of flexible members, such as the three metal tapes or ribbons 15, 16 and 17. The ends of the flexible members are shown securely fastened together around the link 14 by means of rivets 18.

As illustrated in the several figures, these tapes 15, 16 and 17 are thus in superimposed relation and extend through a lightweight assembly of brake plates 19, 20, 21 and 22, see Fig. 4. These brake plates are superimposed and held spaced apart by the extended reaches of the tapes or ribbons 15, 16 and 17, respectively. Each brake plate is formed with spaced apart openings 23—23 and 24—24 along each longitudinal edge thereof and when the plates are superimposed in assembled position these openings are aligned to receive bolts 25—25 and 26—26, respectively, see Figs. 3 and 4.

The several brake plates, which may be superimposed in any number desired depending upon the number of plies of ribbon used, are covered on one side by a cover plate 27 also formed with openings positioned to align with the openings 23—23 and 24—24 for the extended threaded ends of the bolts 25—25 and 26—26 and are covered on the opposite side by a resiliently yieldable means 28. This yieldable means is illustrated herein as a pad of rubber material relatively thicker than the brake plates 19, 20, 21 and 22. While the member 28 is herein shown as a rubber pad, it may be in the form of springs or fluid pressure means or any suitable structure which will normally bias the brake shoes into tight equalized frictional contact with the surfaces of the tapes or ribbons 15, 16 and 17. The nuts 25¹—25¹ and 26¹—26¹ on the bolts are adjustable to regulate the brake pressure on the ribbon surfaces.

To retain the box-like lamination assembled an exterior cover plate 29 formed with bolt openings also alignable with openings 23—23 and 24—24 and similar to plate 27 is mounted thereon.

The ribbons extend from between the brake shoes into a cylindrical housing 30, which may include a rotatable means 31 transverse the interior around which the superimposed lengths of the ribbons are permitted to wind and unwind upon in their multi-ply relation. The housing 30 is suitably connected to the cover plate 27 by an extended tab 32 formed from the housing by bolts 33—33 and nuts 34—34.

The leader assembly L is connected to a load by a depending arm 35 having a flat end 36 and an interiorly threaded tubular end 37. The flat end is formed with openings for bolts 38 and the end 37 is threadedly connected to the threaded shank 39 of a hook fastener 40.

As illustrated, the hook 40 is connected to lines 41 of an article carrier 42, but the hook may be connected to a body harness, not shown, when the cargo is human.

Operation

As the parachute 10 opens, the drag load of the parachute is transmitted through the shroud lines 11 to the steel ribbons 15, 16 and 17. The multiple ribbons pass through and between the lightweight assembly of brake plates from the ribbon housing 30.

As shown the load to be delivered by the parachute is attached to the hook 40 of the assembly and the several nuts and bolts are adjusted, if desired. For example, the load ncessary to pull the ribbons through the brake plate assembly is predetermined by adjustment of the nuts and bolts, which causes the resilient material 28 to maintain a manually variable constant load in the brake plates, which engage the surfaces of each of the ribbons.

Each of the ribbons are preferably very thin and coiled in the housing 30. Their lengths can be determined by the particular energy absorbing requirement necessary to reduce the peak load to the desired value. For example, such a device weighing three pounds including the weight of the ribbon, has been made to produce to draw load of 6,000 pounds for 5 feet deflection. Also, in test 400 pounds draw load per square inch of ribbon brake area has been obtained.

If desired, a time delay arrangement may be incorporated in the device by greasing or oiling the leading sections of the ribbons a short distance.

Thus, there is provided a novel shock absorber to replace parachute leaders and the like to facilitate high velocity cargo delivery, with spin chutes, high speed personnel chutes and the like.

While only one embodiment of the invention is specifically described, it is to be expressly understood that various changes may be resorted to within the scope of the appended claims.

I claim:

1. An energy absorbing fall arresting unit for parachutes comprising a brake assembly including a plurality of stacked superimposed brake shoes, a pair of exterior holding plates mounted on each side of the brake shoe stack, a flat sheet of yieldable means between the inner face of at least one of said holding plates in pressing contact with the top surface of the top shoe of the stack, a plurality of superimposed ribbons sandwiched between the said stacked brake shoes, said ribbons being coupled together only at the ends, a housing united with the brake assembly in which to coil the said ribbons from one end thereof, a coupling on the opposite end for connection to a parachute, and means associated with the housing to couple the said unit to load.

2. A shock absorbing device serving as a leader line unit for coupling shroud lines of a parachute to a load comprising a plurality of superimposed end connected flexible strips, means for normally retaining said strips coiled the greater portion of their length, the smaller portion of said strips being uncoiled and extending through a brake assembly, said assembly comprising a plurality of stacked brake shoes, said shoes being freely held between stop plates, one of each shoes being positioned on each side of one of the said strips, a rubber block for retaining said shoes in contact with the said strips between one of said stop plates and one of said brake shoes, coupling means at the end of the said uncoiled strip portion connecting to the parachute shroud lines, and coupling means operatively associated with the greater coiled portion connecting to a load.

3. A shock absorbing parachute leader comprising an elongated stack of metal ribbons connected together at each end, a housing for coiling the greater portion of said ribbons therein, said housing having a slot for an uncoiled smaller portion of said ribbons to pass through, a brake assembly block secured to the housing including a stack of brake shoes, stop plates mounted on each side of the brake shoe stack, a rubber cushion normally compressed between one of said stop plates and the top surface of the top shoe on one side of the said stock normally urging said shoes into pressing engagment, said shoes being held apart by each ribbon of the uncoiled smaller portion, a shroud line connector on the free end of said uncoiled section of the ribbons and a load coupler on the brake assembly.

DONALD B. DOOLITTLE.

REFERENCES CITED

The following references are of record in the file of this patent:

UNITED STATES PATENTS

| Number | Name | Date |
|---|---|---|
| 1,454,238 | Kaufman | May 8, 1923 |
| 2,393,072 | Skinner | Jan. 15, 1946 |
| 2,483,655 | Schultz | Oct. 4, 1949 |

FOREIGN PATENTS

| Number | Country | Date |
|---|---|---|
| 587,983 | Great Britain | May 12, 1947 |